United States Patent
Nicolai et al.

(10) Patent No.: US 6,273,533 B1
(45) Date of Patent: *Aug. 14, 2001

(54) FRAME PIECE FOR A RACK FOR A SWITCHING CABINET

(75) Inventors: Walter Nicolai, Buseck; Udo Münch, Sinn; Georg Vogel, Schwieberdingen, all of (DE)

(73) Assignee: Rittal-Werk Rudolf Loh GmbH & Co. KG, Herborn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/293,683

(22) Filed: Apr. 16, 1999

(30) Foreign Application Priority Data

Apr. 17, 1998 (DE) .............................................. 198 17 919

(51) Int. Cl.⁷ ...................................................... A47G 29/00
(52) U.S. Cl. ........................ 312/265.1; 211/183; 211/182
(58) Field of Search .............................. 312/265.1, 265.3, 312/265.4, 257.1; 211/26, 183, 189, 182; 361/829

(56) References Cited

U.S. PATENT DOCUMENTS 4,158,998 * 6/1979 Clement ................................ 211/243
5,992,646 * 11/1999 Benner et al. ..................... 312/265.3
6,062,664 * 10/2000 Benner .............................. 312/265.1
6,070,957 * 6/2000 Zachrai ............................. 312/265.1
6,138,843 * 10/2000 Nicolai et al. ....................... 211/183

FOREIGN PATENT DOCUMENTS

4336285 * 4/1995 (DE) .

* cited by examiner

*Primary Examiner*—Peter M. Cuomo
*Assistant Examiner*—Jerry Anderson
(74) *Attorney, Agent, or Firm*—Pauley Petersen Kinne & Fejer

(57) ABSTRACT

A frame piece for a rack of a switching cabinet. With minimum material an optimum result is obtained with regard to fastening planes and fastening direction as well as stability. A profile inside and a profile outside are used to form the frame piece as a closed hollow profile with one or two longitudinally directed hollow spaces. The profile outside delineates a free space to an outside corner edge of the rack. The profile inside has a profile section with several rows of fastening seats or several profile sections at an angle with respect to one another with at least one series of fastening seats. The profile inside and the profile outside form outside edges in a region of the right-angled abutting outsides of the rack. The outside edges are designed as double-layer sealing struts or connected to them in a direction to the outside corner edge connecting struts with or without receiving grooves for sealing elements.

28 Claims, 3 Drawing Sheets

FRAME PIECE FOR A RACK FOR A SWITCHING CABINET

BACKGROUND OF THE INVENTION

1. Field of the Invention

This invention relates to a frame piece for a switching cabinet.

2. Description of Prior Art

Greatly varied requirements are set for a rack for a switching cabinet and these requirements must be fulfilled by all the cross-sectional shapes of the frame pieces used. In an area of the bottom frame or the top frame, one can use frame pieces which have a cross-sectional form different from the vertical frame piece. Especially for the frame pieces which are in the vertical direction of the rack, as many fastening possibilities as possible are required in several directions. Moreover, with as low material expenditure for the frame piece as possible, optimum strength, preferably strength to deformation, and yet simple manufacture of the frame piece should be possible. Moreover, in the region of the vertical outside corner edges of the rack, sufficient free space should be available to apply the hinge for a cabinet door and to form an introduced sealing element for the side walls to be introduced or for the back wall of the cabinet.

Many frame pieces are known for the rack of a switching cabinet, which partly fulfill the requirements named above, but do not offer satisfactory solution in all respects. Frame pieces designed as open hollow profile sections are considerably worse than closed hollow profile sections.

SUMMARY OF THE INVENTION

It is one object of this invention to provide a frame piece for a rack of a switching cabinet which, particularly when used as vertical frame piece, fulfills sufficiently requirements for high strength for universal possibilities of fastening with low material expenditure and simple manufacture.

This object is solved by the following characteristics:

a) With a profile inside and a profile outside, the frame piece forms a closed hollow profile with one or two longitudinally directed hollow spaces;

b) the profile outside delineates a free space to the outside corner edge of the rack;

c) the profile inside has a profile section with several rows of fastening seats or several profile sections at an angle to one another with at least one series of fastening seats; and d) the profile inside and the profile outside form outside edges in a region of the right-angled abutting outsides of the rack, wherein the outside edges are designed as double-layer sealing struts or are connected in a direction to an outside corner edge connecting struts with or without receiving grooves for sealing elements.

The free space to the outside corner edge delineated by the profile sides of the profile outside offers sufficient clearance for swinging a cabinet door as well as to introduce beveled paneling elements at the frame piece. The sealing struts, connecting struts and/or receiving grooves in the connecting struts of the profile outside offer many possible variations. The closed hollow profile of the frame piece with one or two hollow spaces has very good stability, especially deformation strength, which can also be used to minimize the material expenditure for the frame piece, especially when the frame piece is stamped from a strip, is bent and is assembled.

According to one embodiment, the free space is delineated at least in partial regions starting from the outside of the rack by profile sides of the profile outside standing perpendicularly to the facing outsides. Thus, even with a small distance between the outside edges of the frame piece and the outside corner edge of the rack, a sufficiently large inlet opening into the free space is created.

In one preferred embodiment the profile sides of the profile outside delineating the free space are connected through a connecting section with one another and/or with the profile inside, and the free space is thus delineated in its depth in the region of the rack diagonal and the connecting section of the profile outside increases the deformation strength of the frame piece. The possibilities of fastening on the frame piece can be increased in the area of the outside of the profile also, by providing additional fastening seats in the connecting section.

The profile inside is a profiled side guided from outside edge to outside edge, which has fastening seats in a mirror-image manner to the rack diagonal. A greater flexibility with regard to the fastening planes and directions is achieved by the profile inside being formed from three profile sides arranged in a U-shape, where the profile sides starting from the outsides of the rack and thus from the outside edges, at an angle of 45° to the outside edges. In this case, the third profile side, which is perpendicular to the two profile sides of the profile inside have fastening seats in a mirror-image manner to the rack diagonal. The profile sides of the profile outside that stand perpendicular to the outsides of the rack can be connected directly to the profile inside. In this case, the profile inside and the profile outside enclose two identical hollow spaces, which can be designed so that a cross-section is an equilateral triangle or an isosceles rectangular triangle.

However, the direction of the profile sides of the profile inside and profile outside can also be arranged so that the profile inside and the profile outside enclose two identical hollow spaces which have an essentially square or rectangular cross section.

According to another embodiment, for reasons of stability, two profile sides of the profile inside are each arranged in one plane with a profile side of the profile outside whereby the planes are perpendicular to one another and perpendicular to the outsides of the rack.

The stiffening of the profile inside can be simply achieved by connecting the profile sides of the profile inside facing the rack diagonal through a connecting section running perpendicular to the diagonal of the rack. The connecting section of the profile inside can be used as a result of this as an additional fastening plane, by providing the connecting section of the profile inside with additional fastening seats.

If the profile inside and the profile outside enclose a single hollow space which has mirror-image symmetry with respect to the rack diagonal, then the profile inside and the profile outside are at a distance and can be optimally designed for and dictated by stability of the frame piece.

If the profile outside of the frame piece has a connecting section, then this can also carry fastening seats which make it possible to attach parts to the outside of the profile.

According to one embodiment, the profile sides of the profile inside and/or the profile sides of the profile outside form an open, undercut recess, which is open toward the inner space of the rack and/or to the outside corner edge and which facilitates the incorporation of mounting tracks and similar.

In one preferred embodiment, there is mirror-image symmetry with respect to the rack diagonal, because the incorporation of the frame piece into the rack is facilitated. The ends of the frame piece can then be interchanged.

The frame piece can be easily produced as a section of an extruded profile.

According to another manufacturing method, the frame piece is produced as a stamped-bent part, the point of impact and point of connection of which is placed in the area of a connecting section of the profile inside or profile outside.

BRIEF DESCRIPTION OF THE DRAWINGS

This invention will be explained in more detail in view of six different practical examples of a frame piece shown in cross-section, in FIGS. 1–6.

DESCRIPTION OF PREFERRED EMBODIMENTS

In all practical examples, AS1 and AS2 designate the two outsides of a rack meeting at a right angle, and the rack diagonal RGD is shown as the angle bisector. The two outsides, AS1 and AS2, form an outside corner edge AEK, but this does not adversely affect the frame piece with its profile outside 20 and allows sufficient free space FR. The profile outside 20 and the profile inside 10 are, however, preferably, not necessarily arranged in a mirror-image manner to the diagonal of the rack RGD and form outside edges AK1 and AK2 on outsides AS1 and AS2. If the profile inside 10 and the profile outside 20 are outside outer edges AK1 and AK2, preferably, connected to one another in the region of the rack diagonal RGD, then the frame piece encloses two hollow spaces H1 and H2, which can be designed so that they have a cross-section as right-angled isoceles or right-angled equilateral triangles, as shown in the practical examples according to FIGS. 1 to 3. The hollow spaces H1 and H2 may also have an essentially square or rectangular cross-section as shown in the practical examples according to FIGS. 4 and 5.

Figure 5:
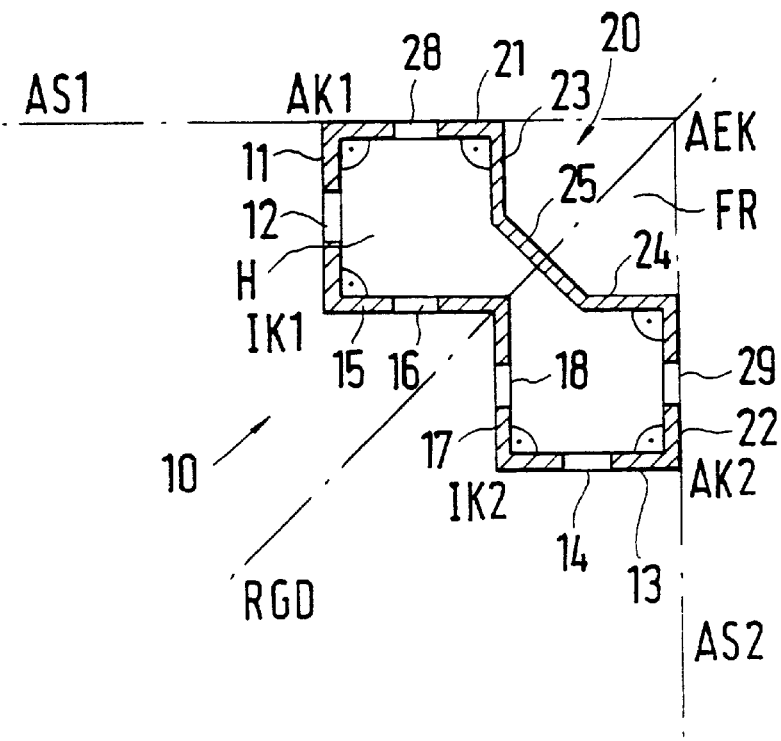
Figure 6:
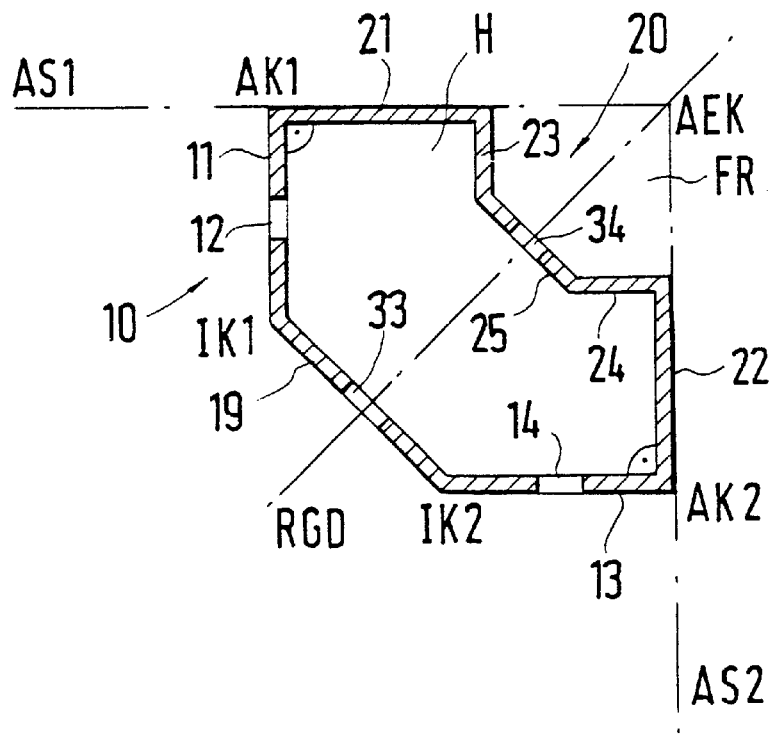

When the profile inside 10 and the profile outside 20 are not joined together between the outside edges AK1 and AK2, then they enclose a single hollow space H, as shown in FIGS. 5 and 6. This hollow space H preferably, but not necessarily, has a cross-section which is arranged in a mirror-image manner to the rack diagonal RGD.

Figure 1:
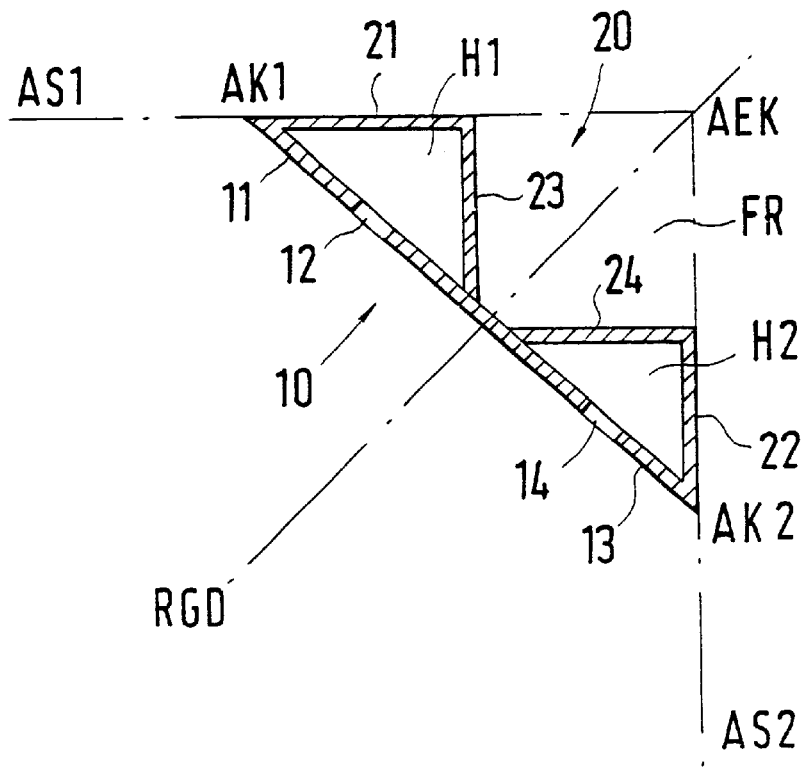

In the practical example according to FIG. 1, the profile inside 10 is designed as a profile side extending all the way from outside edge AK1 to outside edge AK2 and is at an angle of 45° to the joining profile sides of profile outside 20, which coincide with the outsides AS1 and AS2 of the rack, as connecting sections 21 and 22. The connecting sections 21 and 22 of the profile outside 20 continue into profile sides 23 and 25, which are perpendicular to the facing outsides AS1 and AS2 of the rack. The hollow spaces H1 and H2 have an isosceles right-angled triangular cross-section and the free space FR has a square cross-section with a side length determined with the width of profile sides 23 and 24. The profile inside 10 has two sections 11 and 13 which lie in a plane. Sections 11 and 13 have at least one row of fastening seats 12 and 14, which are arranged symmetrically to rack diagonal RGD in sections 11 and 13 of profile inside 10.

Figure 2:
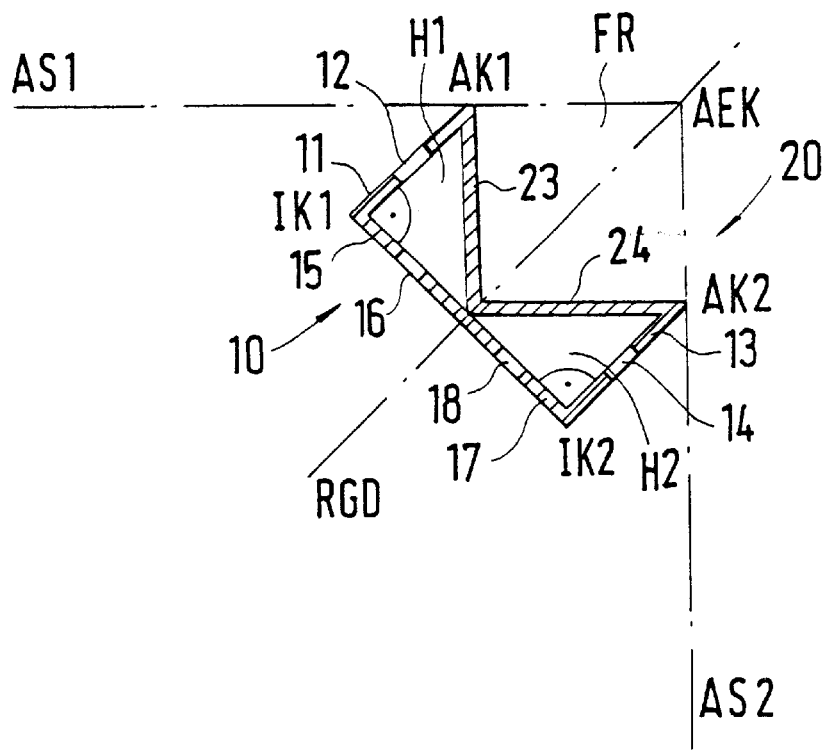

In the practical example according to FIG. 2, the profile outside 20 comprises the two profile sides 23 and 24 standing perpendicularly to the outsides AS1 and AS2 of the rack facing them. On these profile sides 23 and 24, the outside edges AK1 and AK2 continue on profile sides 11 and 13 of the profile inside 10, and are at an angle of 45° to the profile sides 23 and 24 of profile outside 20, so that automatically outside edges AK1 and AK2 are produced which can be used as sealing struts to the outsides AS1 and AS2. The profile sides 11 and 13 of the profile inside 10 are connected to one another through the profile side constructed of sections 15 and 17. The sections 15 and 17 are at a right angle to the profile sides 11 and 13 and are connected with the profile sides 23 and 24 of the profile outside 20 in the region of the rack diagonal RGD. The hollow spaces H1 and H2 have a right-angled isosceles cross-section but by arranging the profile sides 11, 15 and 23, and 13, 17 and 24, differently, can also have an equilateral cross-section, in which case the profile sides always meet at an angle of 60°. The perpendicular arrangement of the profile sides 23 and 24 to the outside AS1 and AS2 of the rack can be maintained. The profile sides 11, 13, 15 and 17 of the profile inside 10 have at least one row of fastening seats 12, 14, 16 and 18, which are preferably arranged in a mirror-image manner to the rack diagonal RGD. The distribution of the fastening seats can also be different with regard to design, direction and distribution in the profile sides, without giving up the mirror-image cross-section with regard to the rack diagonal RGD.

Figure 3:
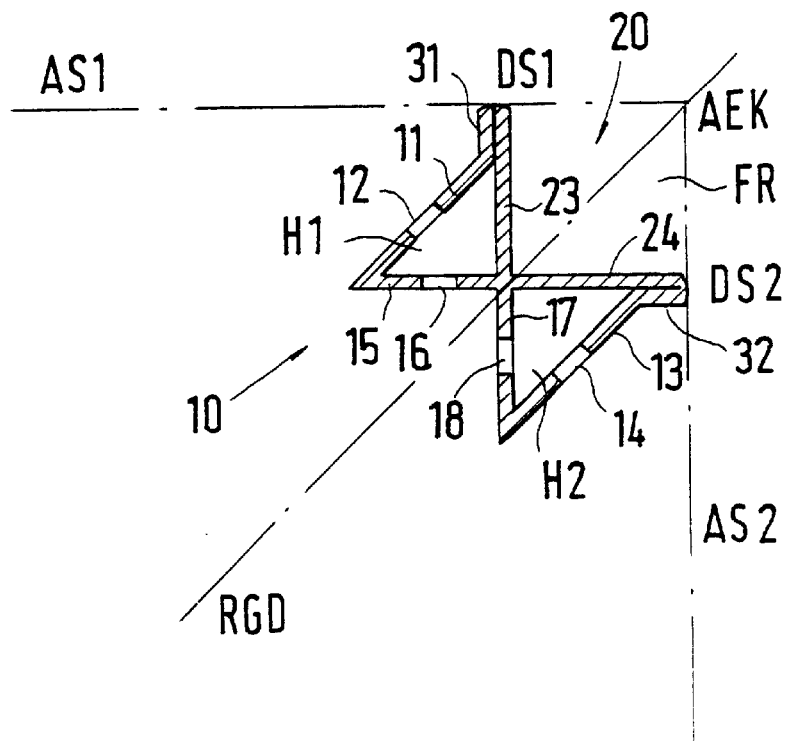

As shown in FIG. 3, with the same distance of the outside edges AK1 and AK2 to the outside corner edge AEK of the frame piece, they coincide with the outsides AS1 and AS2 only in the region of the outside edges AK1 and AK2. In this case, with sections 31 and 32, the ends of the profile sides 23 and 24 of the profile outside 20 are designed as a double-layer sealing struts DS1 and DS2. Profile sides 11 and 13 of the profile inside 10 join to sections 31 and 32, running parallel to the rack diagonal RGD and continuing in the profile sides 15 and 17 of profile inside 10, which meet profile sides 23 and 24 at a right angle and lie with these in two planes perpendicular to the outsides AS1 and AS2. The profile sides 15, 17, 23 and 24 are connected to one another in the region of the frame diagonal RGD. The hollow spaces H1 and H2 have an isosceles right-angled cross-section and are arranged in a mirror-image manner to the rack diagonal RGD. The profile sides 11, 13, 15 and 17 have at least one row of fastening seats 12, 14, 16 and 18.

Figure 4:
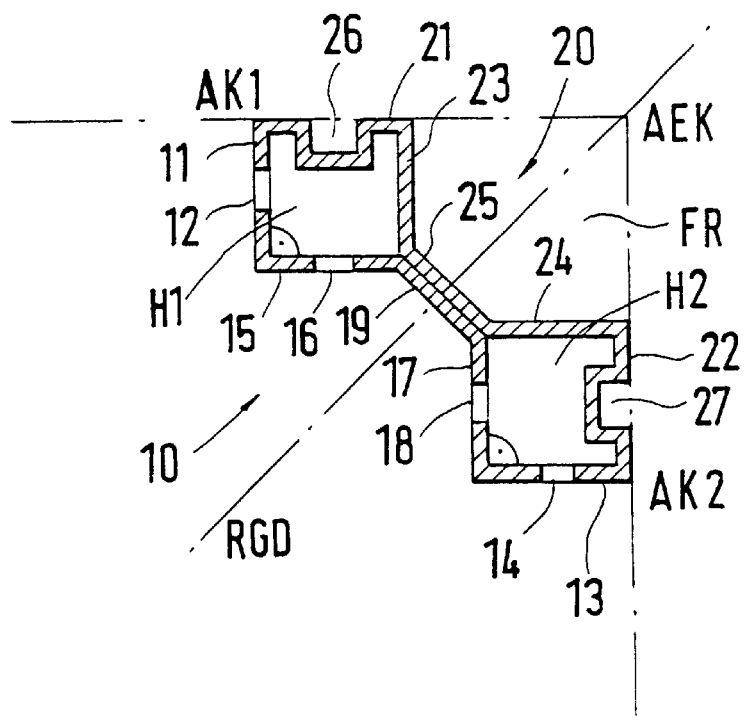

In the practical example according to FIG. 4, the connecting struts 21 and 22 of the profile outside 20 lie on the outsides AS1 and AS2 but have one fastening groove 26 and 27, respectively, for a sealing element. The connecting sections 21 and 22 continue into profile sides 23 and 24, which are perpendicular to the outsides AS1 and AS2 of the rack facing them. The profile sides 23 and 24 do not reach all the way to the rack diagonal RGD, but are connected together through a connecting section 25 which is directed perpendicularly to the rack diagonal RGD and is connected with a connecting section 19 of the profile inside 10 directed in the same direction. This connecting section 19 of the profile inside 10 connects the profile sides 15 and 17 of the profile inside 10 which run parallel to the outsides AS1 and AS2 of the rack. The profile sides 15 and 17 continue in profile sides 11 and 13 in the outside edges AK1 and AK2 of the frame piece. The profile sides 11 and 13 of the profile inside 10 are perpendicular to the outsides AS1 and AS2 facing them. The hollow spaces H1 and H2 have an essentially square cross-section but can also be rectangular. The profile sides 11, 13, 15 and 17 have at least one row of fastening seats 12, 14, 16 and 18. The frame piece is designed so that it shows mirror-image symmetry with respect to the rack diagonal RGD.

FIG. 4 shows a first practical example of a frame piece with a single hollow space H arranged in a mirror-image manner to the rack diagonal RGD. Here, the profile sides 11 and 13 with the rows of fastening seats 12 and 14 start from outer edges AK1 and AK2 and form with the continuing profile sides 15 and 17 with their fastening means 16 and 18 a receptacle which is open to the inside of the rack and has a mirror-image symmetry with respect to the rack diagonal RGD. The profile sides 11 and 13 continue directly into one another on the rack diagonal RGD and are at a distance to the connecting section 25 of the profile outside 20. The connecting section 25 reduces the depth of the free space FR in the region of the rack diagonal RGD. In this practical example of a frame piece, the profile sides of the profile outside 20 are designed as connecting sections 21 and 22 and have fastening seats 28 and 29. The profile sides 11 and 15, and 13 and 17, which are at a right angle to one another, can also be not at a right angle and not parallel to the outsides AS1 and AS2 of the rack, whereupon a single hollow space H remains which shows mirror-image symmetry with respect to the rack diagonal RGD. The receptacles formed by the profile sides 15 and 17 of the profile inside 10 and by the profile sides 23 and 24 as well as by the connecting section 25 can be designed so that they are undercut. These receptacles are open towards the inner space of the rack and toward the outer corner edge AEK.

In the practical example according to FIG. 6, profiles sides 11 and 13 of the profile inside 10 are connected to one another through a connecting section 19, which runs parallel to the connecting section 25 of the profile outside 20 and is arranged at a distance from the connecting section 25. The connecting sections 19 and 25 have fastening seats 33 and 34. At least the profile sides 11 and 13 of the profile inside 10 have fastening seats 12 and 14. The connecting sections 21 and 22 of the profile outside 20 can have receiving grooves for sealing elements instead of the fastening seats 28 and 29.

The profile sides 11, 13, 15 and 17 of the profile inside 10 and the profile sides 23 and 24 of the profile outside 20 of the frame piece according to FIGS. 5 and 6 can also meet inclined at different angles and yet a single hollow space H, which shows mirror-image symmetry with respect to the rack diagonal RGD, can be maintained.

What is claimed is:

1. A frame piece for a rack of a switching cabinet comprising:
   a frame piece forming a closed hollow profile with a profile inside (10) and a profile outside (20) having at least one longitudinally directed hollow space (H or H1 and H2);
   the profile outside (20) delineating a free space (FR) to an outside corner edge (AEK) of the rack;
   the profile inside (10) having a first profile section (11, 13) with one of a plurality of rows of fastening seats (12, 14) and a second profile section (15, 17) at an angle to the first profile section (11, 13), with at least one row of the fastening seats (12, 14, 16, 18) in each; and
   the profile inside (10) and the profile outside (20) near a plurality of outsides (AS1, AS2) of the rack meeting at a right angle and forming a plurality of outside edges (AK1, AK2) that join a plurality of connecting struts (21, 22), a plurality of profile sides (23, 24) of the profile outside (20) correspondingly connected to the connecting struts (21, 22) which are connected to each other by a connecting section (25) which is perpendicular to a diagonal line (RGD) of the frame piece.

2. A frame piece according to claim 1, wherein the free space (FR) at least in partial regions starting from the outsides (AS1, AS2) of the rack is delineated by the profile sides (23, 24) which are positioned perpendicular with respect to the outsides (AS1, AS2).

3. A frame piece according to claim 2, wherein the profile sides (23, 24) of the profile outside (20) are connected through the connecting section (25) to at least one of one another and the profile inside (10).

4. A frame piece according to claim 3, wherein the connecting section (25) has additional fastening seats (34).

5. A frame piece according to claim 4, wherein the profile inside (10) is one of the profile sections (11, 13) guided from one of the outside edges (AK1) to another of the outside edges (AK2), and has the fastening seats (12, 14) arranged in a mirror-image manner to the rack diagonal (RGD).

6. A frame piece according to claim 4, wherein the profile inside (10) is formed from three of the profile sections (11, 13, 15 and 17) arranged in a U-shape, where the profile sections (11, 13) starting from the outsides (AS1, AS2) of the rack and from the outside edges (AK1, AK2) are at an angle of 45° to the outside edges (AK1, AK2).

7. A frame piece according to claim 6, wherein the third profile sections (15 and 17) perpendicular to the two profile sections (11, 13) of the profile inside (10) have fastening seats (16, 18) in a mirror-image manner to the rack diagonal (RGD).

8. A frame piece according to claim 7, wherein the profile sections (23, 24) of the profile outside (20) which stand perpendicular to the outsides (AS1, AS2) of the rack are connected directly to the profile inside (10).

9. A frame piece according to claim 8, wherein the profile inside (10) and the profile outside (20) enclose two of the hollow spaces (H1, H2) formed with one of an isosceles rectangular triangle and an equilateral triangle cross-section.

10. A frame piece according to claim 8, wherein the profile inside (10) and the profile outside (20) enclose two of the hollow spaces (H1, H2) which have one of an essentially square cross-section and an essentially rectangular cross-section.

11. A frame piece according to claim 4, wherein the two profile sections (15 and 17) of the profile inside (10) are arranged in a plane, each with the profile section (23 or 24) of the profile outside (20), where the planes are perpendicular to one another and perpendicular to the outsides (AS1, AS2) of the rack.

12. A frame piece according to claim 4, wherein the profile sections (15, 17) of the profile inside (10) facing the rack diagonal (RGD) are connected to one another through a connecting section (19) which runs perpendicular to the rack diagonal (RGD).

13. A frame piece according to claim 12, wherein the connecting section (19) of the profile inside (10) has additional fastening seats (33).

14. A frame piece according to claim 13, wherein the profile inside (10) and the profile outside (20) enclose a single hollow space (H) which exhibits mirror-image symmetry with respect to the rack diagonal (RGD).

15. A frame piece according to claim 14, wherein the profile outside (20) with the connecting struts (21, 22) have additional fastening seats (27, 28, 29).

16. A frame piece according to claim 15, wherein the frame piece is produced as a section from an extruded profile.

17. A frame piece according to claim 15, wherein the frame piece is produced as a stamped-bent part, an impact point and a connecting point of which is in a region of a connecting section (19 or 29) of one of the profile inside (10) and the profile outside (20).

18. A frame piece according to claim 17, wherein the profile sections (15, 17) of one of the profile inside (10) and the profile sections (23, 24) of the profile outside (20) form an undercut recess which is open to an inside space of at least one of the rack and the outside corner edge (AEK).

19. A frame piece according to claim 18, wherein the frame piece is designed to have a mirror-image symmetry with respect to the rack diagonal (RGD).

20. A frame piece according to claim 1, wherein the profile inside (10) is one of the profile sections (11, 13) guided from one of the outside edges (AK1) to another of the outside edges (AK2), and has the fastening seats (12, 14) arranged in a mirror-image with respect to the diagonal line (RGD) of the frame piece.

21. A frame piece according to claim 1, wherein the profile inside (10) is formed from three of the profile sections (11, 13, 15 and 17) arranged in a U-shape, where the profile sections (11, 13) starting from the outsides (AS1, AS2) of the rack and from the outside edges (AK1, AK2) are at an angle of 45° to the outside edges (AK1, AK2).

22. A frame piece according to claim 1, wherein two of the profile sections (15 and 17) of the profile inside (10) are arranged in a plane, each with the profile section (23 or 24) of the profile outside (20), where the planes are perpendicular to one another and perpendicular to the outsides (AS1, AS2) of the rack.

23. A frame piece according to claim 1, wherein the profile sections (15, 17) of the profile inside (10) facing the rack diagonal (RGD) are connected to one another through a connecting section (19) which runs perpendicular to the rack diagonal (RGD).

24. A frame piece according to claim 1, wherein the profile outside (20) with the connecting struts (21, 22) have additional fastening seats (28, 29).

25. A frame piece according to claim 1, wherein the frame piece is produced from an extruded profile.

26. A frame piece according to claim 1, wherein the frame piece is produced as a stamped-bent part, an impact point and a connecting point of which is in a region of a connecting section (19 or 29) of one of the profile inside (10) and the profile outside (20).

27. A frame piece according to claim 1, wherein the profile sections (15, 17) of one of the profile inside (10) and the profile sections (23, 24) of the profile outside (20) form an undercut recess which is open to an inside space of at least one of the rack and the outside corner edge (AEK).

28. A frame piece according to claim 1, wherein the frame piece has a mirror-image symmetry with respect to the diagonal line (RGD) of the frame piece.

* * * * *